United States Patent
Lassota (10) Patent No.: US 7,506,576 B1
(45) Date of Patent: *Mar. 24, 2009

(54) BREWER WITH MEASURED USE CONTROLLED DISABLEMENT FEATURE

(75) Inventor: Michael W. Lassota, Wauconda, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/104,811

(22) Filed: Apr. 13, 2005

Related U.S. Application Data (62) Division of application No. 10/607,320, filed on Jun. 26, 2003, now Pat. No. 6,931,984.

(51) Int. Cl.
*A47J 31/00* (2006.01)
(52) U.S. Cl. .......................... 99/280; 99/283
(58) Field of Classification Search .............. 99/280, 99/281, 282, 283, 290, 279
See application file for complete search history.

(56) References Cited

U.S. PATENT DOCUMENTS

| | | | | |
|---|---|---|---|---|
| 5,718,163 | A * | 2/1998 | Termini | 99/286 |
| 6,449,532 | B1 * | 9/2002 | Nicol | 700/233 |
| 6,739,205 | B2 * | 5/2004 | Vun Cannon | 73/861.77 |
| 6,931,984 | B2 * | 8/2005 | Lassota | 99/280 |

(Continued)

FOREIGN PATENT DOCUMENTS

WO    WO 93/07085    4/1993

WO    WO 01/73699    10/2001

*Primary Examiner*—Reginald L Alexander
(74) *Attorney, Agent, or Firm*—James W. Potthast; Potthast & Associates (57) ABSTRACT

A beverage brewer (10) with a controller (14) that automatically disables selected brewer functions unless enabled by an enablement code that enables use that is only sufficient to brew a preselected quantity of beverage by mixing the brew ingredient (18) with water has a reader (54, 56, 58, 56, 59, 62) for communicating with and reading the enablement code (86) from a smart card, card with magnetic strip or other data carrying medium (FIGS. 4 and 5). The enablement card when used by a delivery employee has codes for multiple customers, etc. that is used by the delivery employee to enable the brewers to brew the brew ingredient that is being delivered but no more to avoid brewing of ingredient not provided by the distributor of the brew ingredient. Alternatively, one card (52) is used for each location or each brewer and may only be used with the location or brewer that is indicated. The controller (14) is capable of disabling the brewer function, the hot water function, or both, the bypass function, the brewing function or all in response to overuse or in response to the passage of time without required maintenance. The individual enablement code medium may be attached to the container of the brew ingredient permanently or detachably, mailed to the customer with billing, etc. or the enablement code may be entered manually or via a communication modem associated with the brewer (10). When a smart card or magnetic stripe card is used, then the brewer may write to the card the amount of brewer usage or hot water usage which information can later be downloaded to a billing computer at the home office of the distributor in addition to, or in lieu of, automatic disablement of the brewer functions when they exceed preselected maximum amounts.

15 Claims, 6 Drawing Sheets

U.S. PATENT DOCUMENTS

| | | | |
|---|---|---|---|
| 7,162,391 B2 * | 1/2007 | Knepler et al. | 702/182 |
| 2002/0048621 A1 * | 4/2002 | Boyd et al. | 426/77 |
| 2002/0116208 A1 | 8/2002 | Chirnomas | 705/1 |
| 2003/0121937 A1 * | 7/2003 | Black et al. | 222/129.1 |
| 2003/0208419 A1 * | 11/2003 | Bunn | 705/29 |
| 2005/0182599 A1 * | 8/2005 | Knepler et al. | 702/187 |

* cited by examiner

BREWER WITH MEASURED USE CONTROLLED DISABLEMENT FEATURE

CROSS-REFERENCE TO RELATED APPLICATIONS

This application is a division of, and claims the benefit under 35 U.S.C. 120 of, U.S. patent application Ser. No. 10/607,320, of the present inventor, filed Jun. 26, 2003, now U.S. Pat. No. 6,931,984 and entitled "Feature Disablement Controlled Brewer and Method".

BACKGROUND OF THE INVENTION

1. Field of the Invention

This invention relates to electrical coffee brewers and more particularly to commercial electric coffee brewers including those that have hot water faucets for dispensing hot water outside of the brew basket, and methods of brewing and of providing coffee distribution services.

2. Discussion of the Prior Art

In the coffee industry, it is common practice for coffee distributors to provide coffee makers to customers for no charge or for a charge that is at or near the distributor's cost. Very little or no profit is derived by the coffee distributor from the sale or rental of the coffee makers that they provide to the customers. Instead, the coffee distributors hope to make their profit from the sale of coffee to the customers who are using the coffee brewers that the coffee distributors provide. Generally, to insure that they will make profit from the coffee that is made in the brewer that they provide to the customer, they enter into a "total needs" contract pursuant to which the customer, in exchange for the coffee brewer at little or no charge, agrees to purchase all of the coffee used in the brewer from the distributor who provides the brewer.

The inventors have noted that a problem arises when the customer does not "live up to the bargain" and secretly purchase some of the coffee that is used in the brewer from another source that may be less expensive or of different quality. Such other source may be able to provide the coffee at a lesser price because the other source does not need to purchase and provide a brewer to the customer for little or no costs. Consequently, the ability of the coffee distributor to recover the costs of the brewer provided to the customer from the sales of coffee may be reduced.

In addition, generally the distributor assumes the costs of maintaining the brewer with the understanding that the volume of coffee sold by the distributor for use in the brewer will be adequate to cover the expense of maintenance. However, if the actual volume is high because of use of coffee purchased outside of the contract, then the need for high volume maintenance will be proportionately greater but because not all the coffee is being purchased from the distributor the actual purchases do not justify the costs of the maintenance. Most customers may be honest and meet their contractual obligations, but some do not, and the difference may be the difference between a financially successful distributorship and a business failure. There is no practical way to bill additional amounts for the additional use of the brewer beyond the use needed to brew the brew ingredient being sold to the customer of the distributor.

Another maintenance problem encountered with coffee brewers of the type that provide hot water faucets for direct dispensing of hot water for purposes of diluting the brewed coffee at customer's requests, is that many users of the brewer will also use the hot water for many other general purposes such as for cleaning purposes and making other hot drinks such as teas, cocoa and the like. Such use, if it is far in excess of the contemplated normal use for dilution of the coffee brewed by the brewer, may result in disproportionate increased lime accumulation that will lead to increased maintenance. Again, this uncontrolled use of hot water and resultant increased costs of maintenance is not covered by an increase in coffee purchases even if all purchases are made under the contract. There is no practical way to bill additional amounts for this additional use of hot water.

SUMMARY OF THE INVENTION

In accordance with the present invention, the aforementioned problems are overcome or alleviated by providing a coffee brewer with a controller and a controlling, or control, method for automatically disabling a brewer, at least in part, in response to a measured amount of use. The solution to these problems can enable a distributor or operator to maintain tighter control on the use of the brewer by customers and collection of billing for such use.

Preferably, a brew valve is used for passing hot brew water through the brew basket, and the brewer includes means for measuring how much hot brew water has been dispensed through the brew valve, and the controlling means includes means responsive to the measuring means for controlling the disablement means. The controlling means includes means responsive to the enablement code for storing a preselected permitted quantity of brew water use that is to be permitted, means responsive to the measuring means for storing the actual quantity of brew water that has actually passed through the brew valve, and means for comparing the permitted quantity with the actual quantity. If the flow rate is substantially fixed and known, the measuring means may measures the time that the brew valve is open, and the controlling means includes means responsive to the measuring means for storing the time that the brew valve is open. Alternatively, the measuring means may include a flow meter for measuring the quantity of flow through the brew valve, and the controlling means includes means for storing the quantity of flow.

In the case of a brewer with a hot water valve for passing hot water directly from the hot water tank without passing through the ingredient, the brewer is preferably provided with means for measuring how much hot water has been dispensed through the brew valve, and the controlling means includes means for measuring how much hot water is dispensed through the hot water valve. The controlling means includes means responsive to the enablement code for storing a preselected permitted quantity of hot water use that is to be permitted, means responsive to the measuring means for storing the actual quantity of hot water that has actually passed through the hot water valve, and means for comparing the permitted quantity of hot water with the actual quantity of hot water. The quantity is measured by timing the time the hot water valve is open or by measuring the flow with a flow meter. By whatever means measured, the controlling means includes means for storing the quantity of flow of hot water.

The objective of the invention is also obtained in part by providing a beverage brewer having a water tank and means for holding brew ingredient while water from the water tank is passed into contact with the ingredient, with a controller having means for measuring the amount of use of the brewer, means for storing a preselected amount of permitted use, means for disabling the brewer in response to the measured amount of use becoming equal to the stored preselected amount of permitted use means for selectively changing the stored preselected amount of permitted use.

The object is also achieved partly by providing a method of operating a beverage brewer by performing the step of automatically measuring the amount of use of the beverage brewer, automatically disabling the brewer at least in part in response to a measured amount of use exceeding a preselected amount of permitted use. The method preferably includes the step of selectively changing the preselected amount of permitted use. Preferably, the step of changing includes the steps of storing the preselected amount of use in a memory, receiving a code from an external source, and changing the preselected amount of use stored in memory in accordance with the code. Preferably, the code is unique to a single brewer and may not be used to change the preselected amount of use stored in another brewer.

Preferably, the step of selectively changing also includes the steps of delivering a quantity of brew ingredient to a site at which the brewer is located for use in the brewer to produce a brewed beverage, delivering a code carrying medium to the site, reading the code from the code carrying medium, and changing the preselected amount of permitted use in accordance with the code read from the code carrying medium. Preferably, the brew ingredient is delivered in a container and the code-carrying medium is carried by the container. Either the code-carrying medium is visible from the outside of the container, or the code-carrying medium is protectively contained within the container. The code may be printed on a surface of the container that is visible from the outside of the container, and whether on the inside or the outside may be detachably connected to the container.

BRIEF DESCRIPTION OF THE DRAWINGS

The foregoing objects and advantageous features will be explained and others will be made apparent from the following detailed description that is given with reference to the several figures of the drawing, in which.

DETAILED DESCRIPTION

Figure 1:
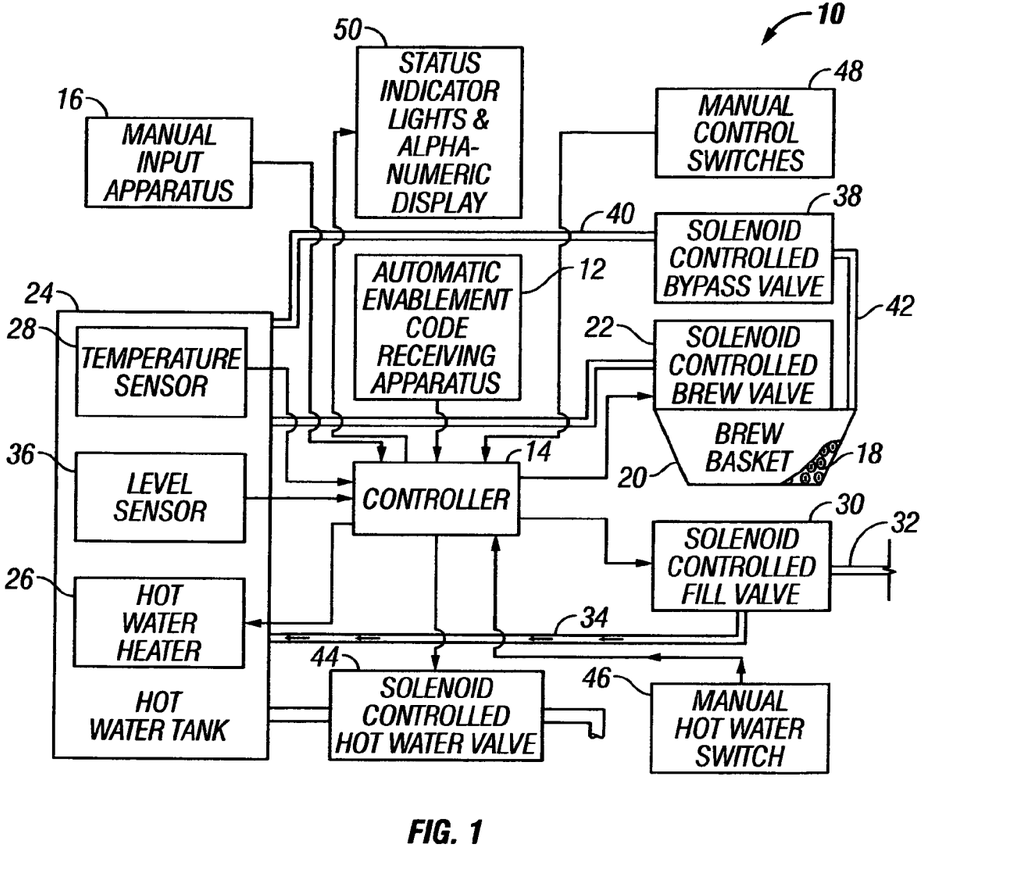
FIG. 1 is a functional block diagram of a brewer of the present invention which advantageously contains an automatic enablement code receiving apparatus for interfacing operational parameter related information to the brewer controller.
Figure 3:
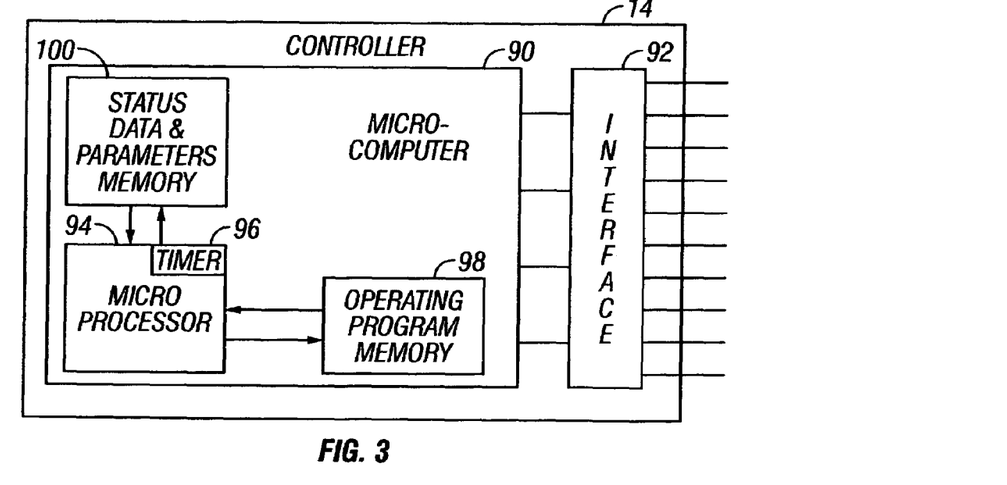
FIG. 3 is a functional block diagram of the controller of FIG. 1, with the understanding that a non-computerized controller could be employed in place of the computerized controller shown here.

Referring now to FIG. 1, the preferred embodiment of the beverage brewer 10 of the present invention is seen to include a novel automatic enablement code receiving apparatus 12, shown in greater detail in FIG. 3, and a controller 14, shown in detail in FIG. 3, that, in addition to other known functions, interfaces with the automatic enablement code receiving apparatus 12. In addition, a manual input apparatus 16 may be used in conjunction with the controller 14 to achieve at least some of the objectives of the invention.

While the particular embodiment of the beverage brewer 10 will be described with reference to the brewing of hot coffee by passing hot water through ground coffee beans, it should be appreciated that the term beverage brewer is also intended to cover hot tea brewers or ice tea abstract brewers as well as any other beverage maker in which water, either cold, hot, or carbonated or not, or other brew liquid is passed into contact with a dry, or semi-liquid, brew ingredient, that dissolves at least in part into the brew liquid to make the brewed beverage. A vending machine for instance may brew soup or broth by passing hot water though a dry mix soup beverage ingredient or make another type of drink in a similar manner. A carbonated drink dispensing system may pass carbonated water through a manifold for mixing with brewed drink syrup. The invention has application, at least in part, to all of these different types of apparatus and different types of brewing ingredient.

In the case of brewer 10 being a hot coffee brewer, the dry brew ingredient of ground coffee beans 18 are located within a brew basket 20 having an open top located beneath the outlet from a solenoid controlled brew valve 22 that is connected to an outlet of a hot water tank 24. The hot water tank 24 has an electrical hot water heater 26 to heat the water to a preselected temperature that is detected by a temperature sensor 28. When the valve is opened by an electrical signal generated by the controller 24, hot water from the hot water tank 24 passes through the brew valve 22 and into the open top of the brew basket 20, either continuously or intermittently in a controlled manner. The hot water mixes with the ground coffee beans 18, and as it passes through the ground coffee beans 18, freshly brewed coffee beverage is produced. The freshly brewed coffee passes through a drain hole in the bottom of the brew basket 20 and into a suitable container (not shown), such as an insulted dispenser or a serving carafe, ultimately for service to consumers.

There is a solenoid controlled fill valve 30 that has an inlet connected to a public or private source of water through a connection hose 32 and an outlet connected through a pipe 34 to fill the hot water tank with fresh water as it become depleted during the successive brew cycles. Level sensors 36 detect when the level of the water in the hot water tank 24 reaches a preselected maximum level and a preselected minimum level. When the actual level is beneath the preselected minimum level the controller 14 responds by actuating the solenoid controlled fill valve 30 to open to add water to the hot water tank 24. When the actual level reaches the maximum level, the controller 14 shuts off the solenoid controlled fill valve 30 to terminate the addition of water to the tank 24. In this way, the level of the hot water is maintained between these two limits, such that the head pressure in the tank remains substantially fixed.

In addition to the brew valve 22 passing hot water into the brew basket 20 there is also a solenoid controlled bypass valve 38 that passes hot water from the hot water tank 24 via a tank outlet pipe 40 to the brew basket 20 through a bypass outlet 42. Water from the bypass outlet passes through the brew basket 20 bypasses, rather than passing through the ground coffee beans 18 contained within the brew basket 20. The bypass water is simply hot water added to the brewed beverage that passes out of the drain hole in the brew basket 20 to dilute the beverage in the container.

One other valve is the solenoid controlled hot water valve 44 associated with a manual hot water switch 46. The manual hot water switch 46 is a normally open switch that must be manually held in a closed position. So long as the manual hot water switch 46 is manually held closed, the solenoid controlled hot water valve 44 remains open, but as soon as the manually hot water switch 46 is released, the switch 46 returns to the open position and the solenoid controlled hot water valve 44 is closed.

There are other manually operated switches and interfaces with the controller 14 generally indicated by manual control switches 48 including a brew start switch to begin a brew cycle and an emergency stop switch to stop a brew cycle prematurely. In addition, the brewer 10 has a plurality of status indicator lights and preferably an alphanumeric display screen 50 to display messages and status indications from the controller regarding operating status and programming information. Programming of the controller 14 or inputting of operating parameters and enablement codes can be achieved by means of the manual input apparatus 16, such as keypad, or even a full keyboard of alphanumeric characters.

The details of the elements of the brewer 10 do not form a part of this invention except as may otherwise be indicated. If such details are desired, then reference should be made to one or more of the following patents and applications: U.S. Pat. No. 5,000,082 issued Mar. 19, 1991 to Zbigniew G. Lassota for "Beverage Maker and Method of Making Beverage"; U.S. Pat. No. 5,331,885 issued Jul. 26, 1994 to Zbigniew. Lassota for "Semiautomatic Beverage Maker and Method"; U.S. Pat. No. 6,543,335 issued Apr. 8, 2003 to Zbigniew G. Lassota for "Brewing System with Electrical Controller and Method"; U.S. Pat. No. 6,148,717 issued Nov. 21, 2000 to Zbigniew G. Lassota for "Oxygenating Tea Maker and Method"; U.S. patent application Ser. No. 09/438,094 filed Nov. 10, 1999 for "Beverage Maker with Intermittent Beverage Liquid dispenser and Apparatus and Method for Uniform Contact of Brew Ingredient with Brew" of Zbigniew G. Lassota Referring now to FIG. 2, in accordance with the invention, preferably enablement codes are automatically read into the controller 14 by means of the automatic enablement code receiving apparatus 12. The manual input apparatus 16 is preferably used to input enablement codes directly into the controller 14 as a backup method in the event there is any difficulty with the enablement code receiving apparatus. The enablement code receiving apparatus is preferably a smart card reading device or interface that is capable of interfacing 12 with a so-called "smart card", i.e. a credit card-like plastic card or the like with an embedded computer chip containing a microcomputer with two-way interfacing capability and non-volatile memory. Further details of such a smart card may be acquired by reference to U.S. Pat. Nos. 4,868,376 and 4,623,207 that are hereby incorporated by reference. As will be explained below in greater detail, the smart card will contain identification codes for each of the brewers on a distributors delivery route and an associated enablement code that will enable the brewer for a preselected amount of use of the brewer, the hot water faucet, or both. The amount of use that is enabled will be established by the distributor will be sufficient to enable the particular brewer to brew all the brew ingredient, such as ground coffee or tea. If there is a hot water faucet, then the code may enable a preselected quantity of use of the hot water apart from the brewing function.

Preferably, the preselected quantity of use of the hot water is entered into the smart card by the distributor and is based upon agreement between the distributor and the customer. A customer who wants more hot water usage than is normally provided can purchase more use from the distributor. When the distributor has their employee deliver the coffee, they provide a truck with the individually identified orders of coffee or the like to be delivered together with a smart card 52, FIGS. 4 and 5, that has been preloaded with information relevant to the orders. When the delivery employee delivers an order, at the same time, the employee locates the smart card 52 into operative association with the smart card interface 54, FIG. 2. The controller 14 and the smart card 52 then communicate with each other as needed to enable the brewer in accordance with the brew quantity, hot water quantity or both originally stored in the smart card 52 prior to the delivery.

Figure 2:
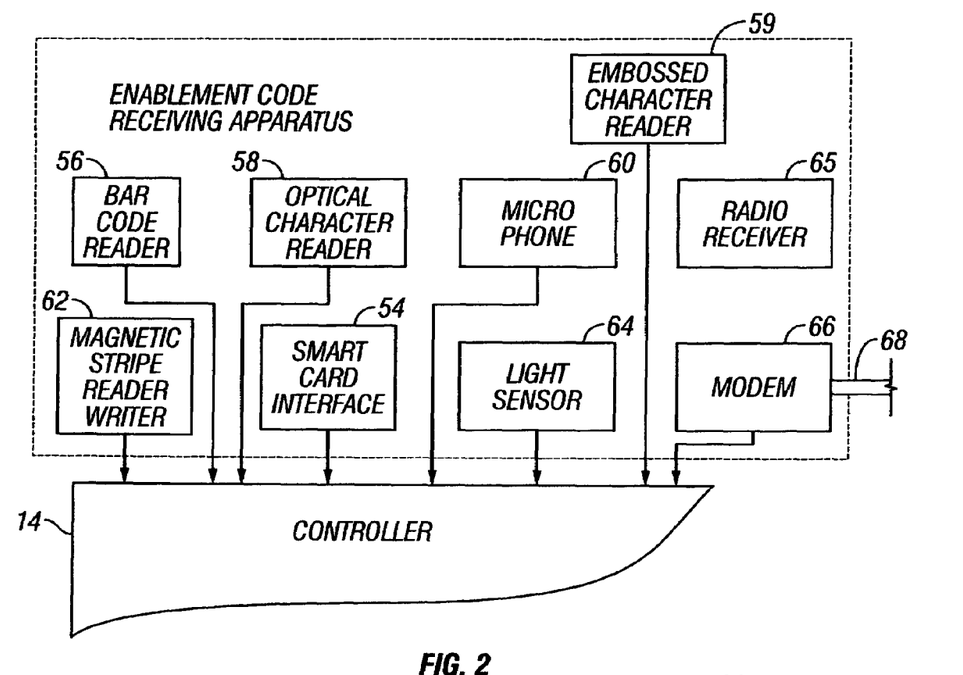
FIG. 2 is a functional block diagram of the automatic enablement code receiving apparatus functional block of FIG. 1.

Still referring to FIG. 2, while a smart card may be the most sophisticated method of enablement, other enablement techniques are also contemplated that have their own relative advantages. If the brewer 10 does not have a smart card reader 54, or in addition to a smart card reader 54, it has one or more of the following apparatus: a bar code reader 56, an optical character reader 58, microphone 60, a magnetic stripe reader, or reader/writer 62 and a light sensor 64, preferably infrared or ultraviolet. There is also a modem 66 for telephonic, cable, direct satellite, T1, fiber optic, DSN or the like, for enabling transfer of data to an from the controller 14 via an appropriate connection 68.

In the case of the hot water usage, the smart card 52 may receive information from the controller 14 as to how much usage there has been since the last contact and then store this amount for downloading to a remote billing computer connected via an internet, telephone, cable, satellite uplink via the modem 66 and the suitable connection 68. After the identification code of the brewer is recognized by the smart card 52 and the preselected quantity enabled, the enablement quantity stored in the smart card 52 is reset to zero to prevent multiple readings by the brewer controller 14. Preferably, the smart card 52 may only be updated with new enablement data by management at a home office (not shown) connected via the modem and the connection 68 prior to the delivery driver starting his route with a newly loaded smart card 52 corresponding to the deliveries for which the driver is scheduled.

Figure 5:
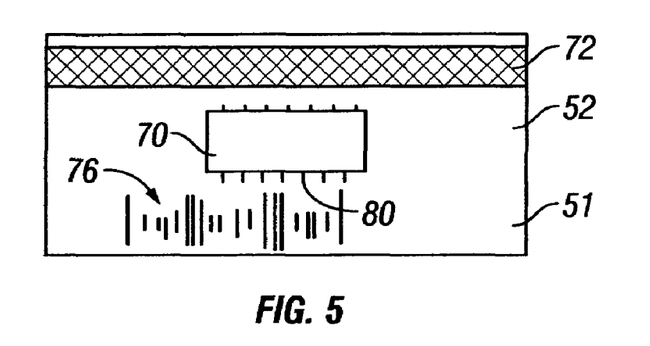
FIG. 5 is another side of the smart card of FIG. 4 showing the computer chip carried by the card as well as an optional magnetic stripe for storing and providing data and a bar code for providing data unique to the customer and the brewer.

Referring to FIG. 5, if the brewer is provided with a magnetic stripe reader/writer 62, then a card with a magnetic stripe 72, like the smart card 52 but not necessarily carrying a microcomputer 70, is provided to the distributor's driver in lieu of the smart card 52. Depending upon the circumstances the magnetic strip is encoded with the enablement codes for all of the brewers of each of the accounts on the route of the delivery employee. Alternatively, a separate card with a magnetic strip 72 is provided for each customer or for each brewer. While each order may be associated with only one brewer, in the case of a customer with multiple brewers of the distributor at one location, one card may have information relating to all of the multiple brewers at the one location. Preferably, the card with magnetic stripe is read by the magnetic stripe reader and after being read and received by the associated brewers, the enablement information is automatically erased from the magnetic stripe so that it may not be read twice to provide unauthorized additional enablement. In addition, with respect to the hot water use, the amount of use stored in the controller is written onto the magnetic stripe for subsequent reading by the billing computer at the office of the distributor.

It should be appreciated, that any writable memory medium may be used with equal effect, such as a floppy disc, a writable compact disc, etc. with equal result as with the magnetic strip or the smart card, and that the main difference between different mediums is capacity, durability, cost and ease of use.

Figure 6:
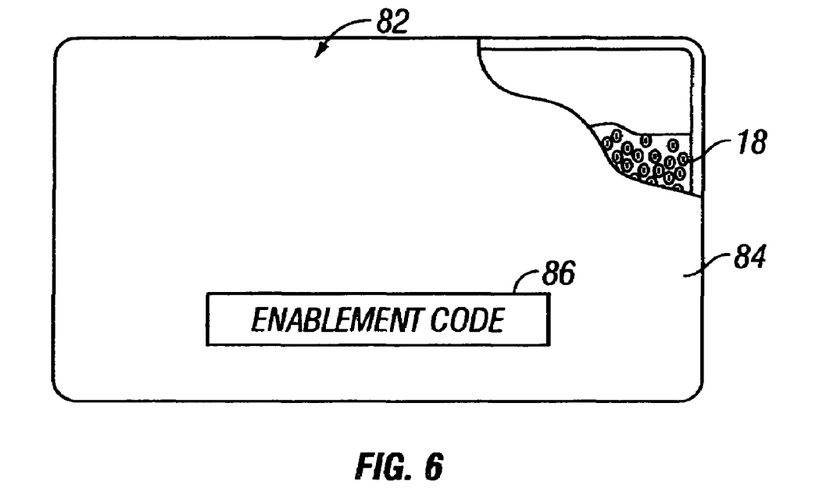
FIG. 6 is an example of a smart ingredient package with a printed code, printed magnetic code or magnetic encodable strip located on the outside of the package that can be read by the brewer directly while attached to the package, or which is releasably attached by means that enables easy removal, such as by adhesive or by a serrated tear piece, for reading of the code while separated from the package and without opening of the package, either to enable the brewer functions being controlled, to increment the amount of usage permitted or both.
Figure 7:
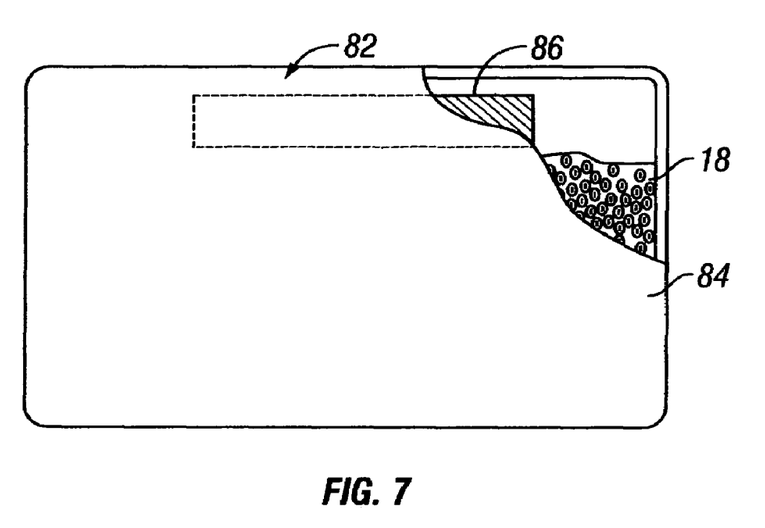
FIG. 7 is another smart ingredient package in which either a magnetic encodable strip or encoded printed strip is protectively contained within the package and which, in the case of the encoded magnetic strip may be read without opening of the package or removal of the strip from the package for reading or which, in the case of a printed code, is exposed only when the package is opened, or in the case of either a magnetically coded strip or a printed strip, may be read only after being removed from the package, to enable the brewer functions being controlled, to increment the amount of usage permitted or both.

Referring to FIGS. 6 and 7, other media can be used that do not enable receiving and storing hot water usage or brew valve usage information. In the case of a bar code reader 56, FIG. 2, a bar code of such as the bar code 76 shown in FIG. 5, may be written or printed directly on the outside envelope 84 of a ingredient container 84 for brew ingredient, such or may be printed on a tag or other carrying piece removable attached to the container package 84 by adhesive or by other means. Since the enablement code 86 other non-writable memory medium may not be written on, it may not be used to store brewer usage information. Thus, the enablement code-carrying medium may simply be left with the customer to allow the customer to enable the brewer. The brewer may only read enablement data that has the code associated with the brewer. The bar code should include a serial number or other number unique to the package of brew ingredient on which it is printed or attached. This container serial number is stored by the controller and compared to all other enablement codes subsequently read into the controller 14. If the comparison results in a match, indicating that an attempt is being made to enable the brewer twice with the same enablement code, the controller 14 disregards the associated enablement code and does not enable the brewer in response to the code. A container enablement code may only be used once to enable the brewer and only the brewer or brewers associated with the customer account.

Referring again to FIG. 2, the codes and enablement code my be represented by light signals detected the light sensor 64 in which case a short range infrared transmitter, or ultraviolet transmitter, like the kind used for remote control units for electronic devices may be used to transmit digital code bearing light signals. Similarly, a radio transmitter, such as used for garage door openers and the like could be used instead of a light transmitter to transmit enablement code to the radio receiver 65. Similarly, an acoustic signal generator could be used for transmitting code to the microphone 60. In these situation the code transmitter would be associated with a microcomputer for storing the codes for a plurality of customers and brewers and operating the associated transmitters to selectively transmit the codes. The advantage of these remote code transmission devices is that physical contact does not need to be made with the brewer by the delivery employee. The programming can be done, for instance, from the opposite side of a service counter without having to enter the work area.

Another approach, that does not require any code carrying mediums to be carried by the delivery person or codes to be left with the customer is to provide the brewer 10 with a modem 66 through which the controller 14 communicates with the distributors billing computer. The modem could be a telephone, cable, fiber optic cable, satellite cable, or any other type of modem that enables data communication between the distributor billing computer and the controller 14. When the billing computer receives information that a delivery is being made to a particular customer for a particular brewer, it is programmed to automatically call the brewer and transmit the associated enablement codes that correspond to the shipment being sent. Likewise, when the billing computer calls the brewer, it can query the brewer as to the amount of brew valve usage, the amount of hot water usage or the amount of both types of usage, and then automatically adjust the billing accordingly rather than allow disablement for use beyond that required to brew the brew ingredient being delivered.

Figure 4:
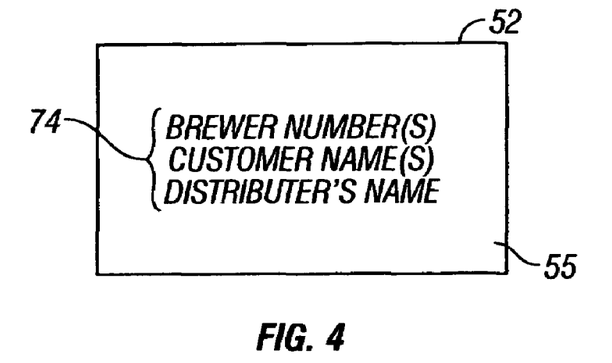
FIG. 4 is one side of a "smart card" used in association with the brewer to provide enablement data to the brewer in accordance with the flow chart of FIG. 3.

Referring again to FIGS. 3 and 4, a schematic illustration of the smart card 52 is seen to include on a front side 55 optically readable characters 74 readable by the optical character reader 59. They include the brewer serial number or serial numbers to which its information relates, along with the name of the customer or names of the customers and the operator's, or distributor's name. These characters 74 may also be raised, or embossed, characters that may be read by the embossed character reader 59, FIG. 2. Referring to FIG. 4, the backside 51 includes a magnetic stripe 72, the microcomputer 70 and information in barcode 76. The microcomputer 70 is preferably is preprogrammed but is also programmable and parameter adjustable as described herein. Any programmable computer may be used that has sufficient memory for storage of both operating software, serial numbers, customer names, etc. and has connection points 80 with which a smart card reader can make electrical connection. The backside 51 may also have optically readable characters, and the magnetic stripe 72 or the microcomputer 70 or the bar code may be mounted on the front 55 of the card 52.

Referring again to FIG. 6, in accordance with one aspect of the invention, a smart ingredient package 82 has a brew ingredient container 84 that envelopes brew ingredient 18 and carries with it an enablement code medium 86, such as a printed bar code, or printed optically readable characters on paper, that can be read by interfacing it with the bar code reader 56 or the optical character reader 58. Such printing may be directly on the outside of the container 84 or on a removable strip that is held to the outside of the container 84 by adhesive or on a tear strip that is detachable from the container. If not removable, then the readers must be capable of operating remotely, such as bar code readers used in check out counters at retail stores or optical character readers used in mail distribution centers and the like. Alternatively, the enablement code 86 is a magnetic stripe like magnetic stripe 72 of the enablement code medium 52 and mounted on plastic or other relatively rigid card or other base and containing enablement code that is readable by the magnetic strip reader 62. In such case, the magnetic stripe is held to the container by removable means such as adhesive and may be removed to interface it with the magnetic stripe reader 62. Likewise, if the code is in embossed character format, then the magnetic stripe is removed from the container 84 for reading by the embossed character reader 59.

Alternatively, or additionally, as seen in FIG. 7, the enablement code medium is protectively contained within the container 84. In such case, the enablement code could be contained within the memory of a microcomputer chip such as used on smart cards or on a magnetic stripe.

Referring to FIG. 3, the controller 14 preferably includes a microcomputer 90 interconnected to the various other active elements of the brewer shown interconnected with the controller 14 in FIG. 1 through an appropriate interface 92 composed of individual interface circuits. These interface circuits convert signal levels and types of signals to enable the microcomputer communicate with the various active elements with which it interacts in the manner of and as described herein. In addition to a microprocessor 94 with a timer function 96, the microcomputer 90 has operating program memory 98 and a data memory 100 for storing status data and preselected parameters. The type of informational data and how it is manipulated by the microprocessor 94 to achieve the objectives of the invention is that which is new. The software that is stored in the program, or software, memory 98 is illustrated and described below with reference to FIGS. 8 and 9, and the type of data stored in the status data and parameters memory 100 is as indicated above and will be described in greater detail below with reference to the algorithms of FIGS. 8 and 9.

Figure 8:
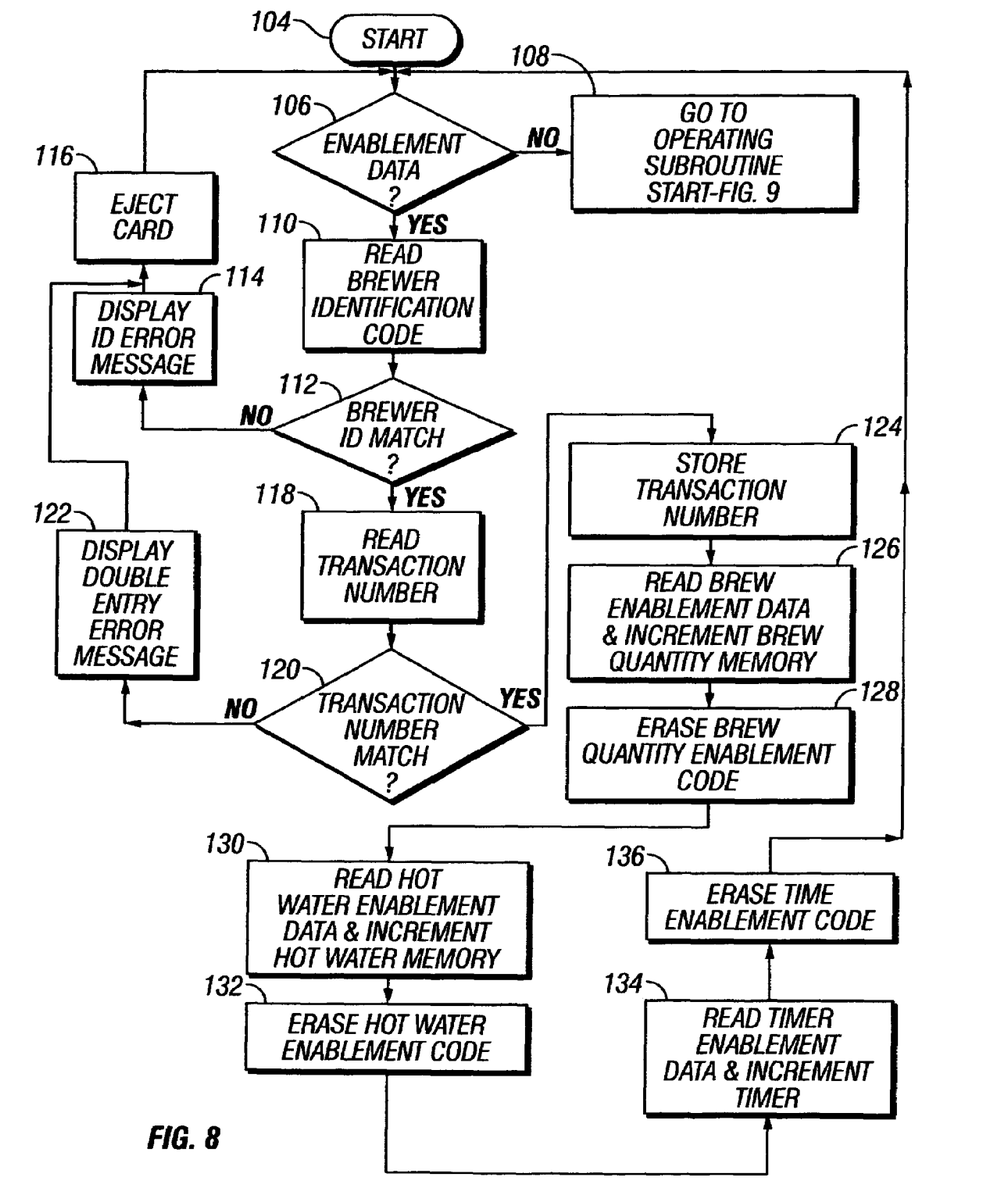
FIG. 8 is a flow chart, or algorithm, of the preferred form of the read enablement software stored in the operating program memory pursuant to which the microprocessor of FIG. 2 reads enablement data to increment any, either or all of the brew cycle/brew quantity memory, the hot water-faucet valve memory and the timer.

Referring first to FIG. 8, after start in step 104, a determination is made in step 106 as to whether enablement data is being presented to the brewer 10 for reading. If not, then in step 108, the program shifts to the operations subroutine start, shown in FIG. 9 and described with reference to FIG. 9, below. If enablement data is being presented, then in step 110, the brewer identification code is read from the enablement data being presented. Then in step 112 a determination is made as to whether there is a match of the brewer identification, or customer account identification, or location identification, stored within the data and parameters memory 100 and the corresponding identification code read from the enablement data being presented by whatever one of the several receiving and matching code transmitting means noted above. If there is not a match, then in step 114 and ID ERROR message is displayed on the on the alphanumeric display 50 and in step 116 the card or other device engaged with a data reader is ejected from the brewer. Alternatively an error status light is lit to indicate to the person attempting to load enablement data that an incorrect identification has been provided.

In the case of multiple readers of different types of code, corresponding data is read from the multiple sources and if there is not a match of corresponding data, such as the name of the customer in both magnetic code and in bar code, for instance, then even if some of the data is correct with respect to identification matching, receipt of the enablement data will be rejected. In such case, the message displayed may be "NO MATCH".

If there is a match, then in step 118, the transaction number is read, and in step 120 a determination is made as to whether there is a match between the transaction number read in step 118 with any one of the transaction numbers stored in the transaction number section of the data and parameters memory 100. If there is a match, indicating that the enablement data contained in the card or other device has already been entered into the brewer controller 14, then in step 122, a message ID is displayed indicating that double entries are not allowed, and then the program proceeds to step 116 to eject the card and return to start.

If there is not a match, indicating that this entry has not previously been made, then in step 124, the transaction number is stored in the data memory 100 for comparison during the next attempted data entry. Next, in step 126, the brew enablement data is read and the brew quantity section of the data memory is incremented accordingly. Next in step 128, the brew quantity enablement code stored in the computer of a smart card or on a magnetic strip of a smart card or a regular card is erased to doubly insure that the card will not be used again to increment the brew quantity memory.

Next, in step 130 the hot water enablement data is read and the hot water memory section of the data memory 100 is incremented accordingly. Then, in step 132 the hot water enablement code is erased.

Following step 132, the timer enablement data is read and the timer incremented accordingly in step 134, and then in step 136 the timer enablement code that was just read is erased, and the program returns to start 104.

Figure 9:
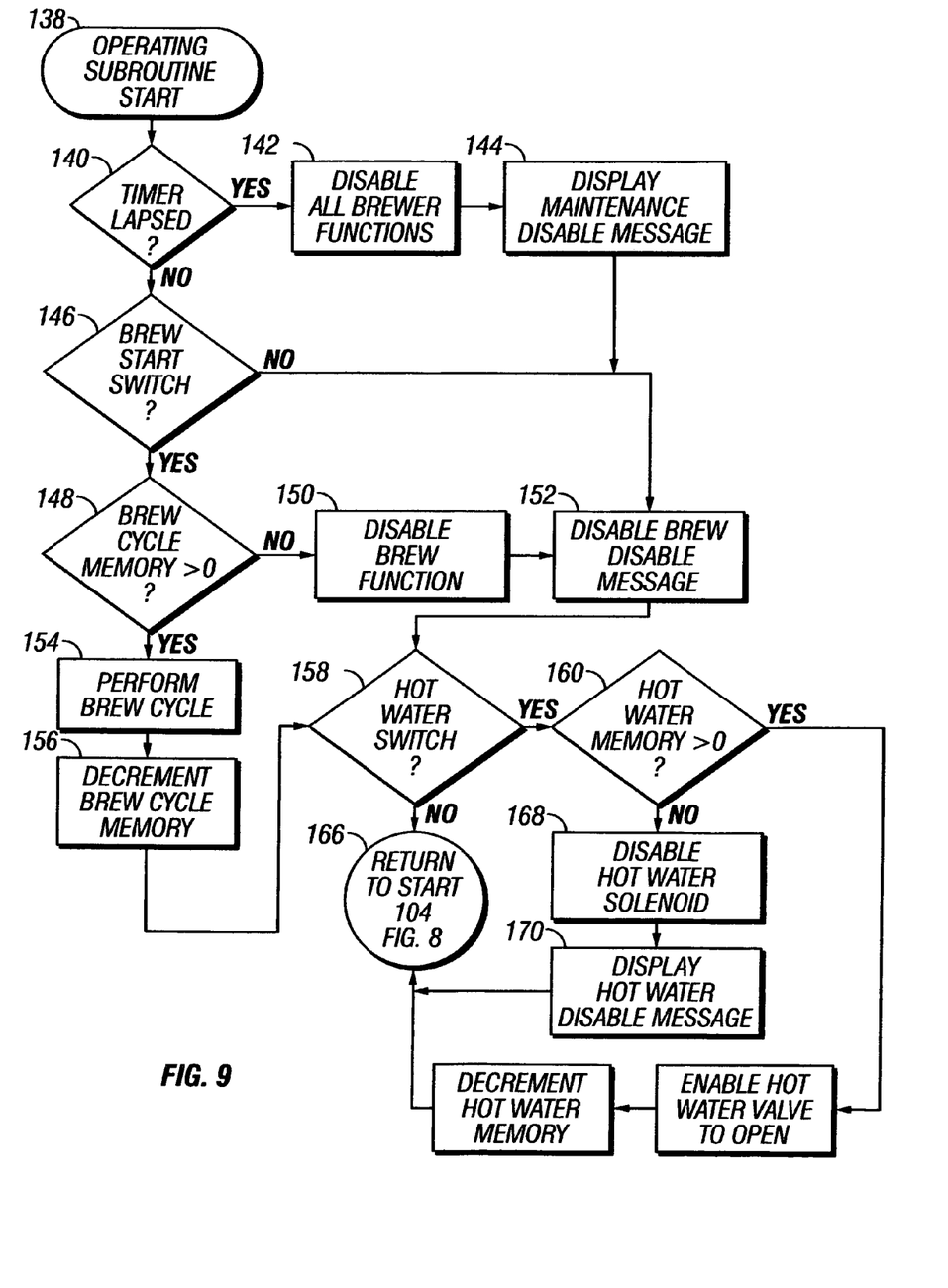
FIG. 9 is a flow chart, or algorithm, of the preferred form of the operating subroutine of FIG. 8 stored in the operating program memory of FIG. 1 and pursuant to which the brewer is selectively disabled if use exceeds a preselected maximum use or if timed usage expires.

If there is no enablement data being presented, the program in step 108 goes to the operating subroutine of FIG. 9. After the start, in step 140 a determination is made as to whether the timer 96 has lapsed, i.e. has reached a time of zero. If so, then in step 142, all brewer functions are disabled, and in step 144 a message is displayed indicating that all brewer functions have been disabled due to need for maintenance. Alternatively, if the timer has been allowed to lapse because of failure to make timely payments a different message will be displayed, as desired.

If the time has not elapsed in the timer 96, then in step 146 a determination is made as to whether the brew start switch has been actuated indicating that someone is attempting to start a brew cycle. If so, then in step 148, a determination is made whether the brew cycle memory section of the data memory 100 is greater than zero, indicating that another brew cycle is permitted. If the brew cycle memory section is not greater than zero, then in step 150 the brew function is disabled and in step 152 a brew disable message is displayed or a status light indicator is lit to indicate the disablement.

If the brew cycle memory is greater than zero, then in step 154 the brew cycle is performed, and in step 156 the brew cycle memory section is decremented, i.e. decreased toward a count of zero. The program then proceeds to step 158 to determine whether the hot water switch has been actuated indicating that it is desired to operate the hot water solenoid controlled valve to an open position to dispense hot water. If the hot water switch is actuated, then in step 160 a determination is made whether the hot water memory section of the data memory 100 is greater than zero. If it is greater than zero, indicating that further hot water usage is permitted, then in step 162 the hot water solenoid controlled valve is enabled to open in response to the closure of the hot water switch. While the hot water solenoid is kept open, in step 164, the hot water memory section of the data memory 100 is decremented by the amount of usage, which may generally be measured in terms of length of time that the hot water valve is kept open in the case of a brewer in which the head level in the hot water tank is kept fixed. The program then returns to start 104 of the routine of FIG. 8. Likewise, if the hot water switch is not being actuated, the program returns to start 104, FIG. 8, in step 166.

Returning to step 160, if the hot water memory is not greater than zero then in step 168, the hot water solenoid is disabled from opening in response to actuation of the hot water switch 46, FIG. 1, and in step 170 an appropriate hot water disable message is displayed on the display 50, is indicated by status lights, or both. The program then returns to start 104, FIG. 8, in step 166.

It should be appreciate that the foregoing is merely exemplary and that many variations, permutations, combinations and obvious changes may be made to the details of the embodiment of the detailed description without departing from the spirit and scope of the invention as defined in the following appended claims. If more detailed information is desired with respect to the smart food ingredient package, reference should be made to U.S. patent application Ser. No. 10/607,003 filed Jun. 26, 2003 of Christopher Nowak, Michael W. Lassota and Zbigniew G. Lassota, entitled "Smart Ingredient Package and Method", commonly owned with this application, which is hereby incorporated by reference.

The invention claimed is:

1. In a beverage brewer having a water tank and a brew basket for holding brew ingredient and a brew valve for passing water from the water tank to the brew basket and into contact with the ingredient, the improvement being a controller, comprising:
   means for measuring a total amount of time that the brew valve is open;
   means for storing the measured total amount of time that the brew valve is open;
   means for storing a preselected stored amount of permitted amount of total time of opening of the brew valve;
   means for selectively changing at least one of the stored preselected total amount of time of opening of the brew valve and the stored measured total amount of time that the brew valve is open;
   means for disabling the brewer in response to the measured amount of opening of the brew valve becoming equal to the stored preselected amount of permitted amount of opening of the brew valve until at least one of the stored amount of permitted total time of opening of the brew valve and the stored measured total amount of time that the brew valve is open is changed by the selectively changing means such that the stored measured amount of permitted amount of total time of opening of the brew valve is greater than the stored measured total amount of time that the brew valve is open.

2. The brewer of claim 1 in which the measuring means includes means for storing the length of time that the brew valve is open.

3. The brewer of claim 1 in which the measuring means includes a flow meter for measuring the amount of water that has flowed from the water tank.

4. The brewer of claim 1 in which the selectively changing means includes means for reading a code from an external source of code to increase the preselected amount of permitted use that is stored.

5. The brewer of claim 4 in which the code is unique to a single brewer and may not be used to change the stored preselected amount of permitted use of another brewer that does not have the same code.

6. The brewer of claim 4 in which the selectively changing means includes one of (a) means for reading a smart card, (b) means for optically reading characters, (c) means for sensing an optical signal, (d) a keypad, (e) means for detecting an audible signal, and (f) a telephonic modem.

7. The brewer of claim 1 in combination with a smart card readable by the smart card reading means to selectively change the stored preselected amount of permitted use.

8. The brewer of claim 1 in which the means for selectively changing the stored preselected amount of permitted use includes
   means for reading an external code representative of the change, and
   an external source of the code that is external of the brewer.

9. In a beverage brewer having a water tank and a brew basket for holding brew ingredient and a brew valve for passing water from the water tank to the brew basket and into contact with the ingredient, the improvement, comprising:
   a water valve for dispensing water from the water tank apart from the brew basket;
   means for measuring a measured amount of use of the water valve;
   means for storing the measured amount of use of the water valve;
   means for storing a preselected amount of permitted use of the water valve;
   means for selectively changing at least one of the stored preselected total amount of time of opening of the water valve and the stored measured total amount of time that the brew valve is open;
   means for disabling the brewer for an indefinite amount of time in response to the measured amount of use the water valve becoming equal to the stored preselected amount of permitted use of the water valve until at least one of the stored amount of permitted total time of opening of the brew valve and the stored measured total amount of time that the brew valve is open is changed by the selectively changing means, such that the stored measured amount of permitted amount of total time of opening of the brew valve is greater than the stored measured total amount of time that the brew valve is open such that the stored preselected amount of permitted use of the water valve is greater than the stored measured amount of use.

10. The brewer of claim 9 in which the measuring means includes a flow meter for measuring the amount of water that has flowed from the water valve.

11. The brewer of claim 9 in which the selectively changing means includes means for reading a code from an external source of code to increase the preselected amount of permitted use that is stored.

12. The brewer of claim 11 in which the code is unique to a single brewer and may not be used to change the stored preselected amount of permitted use of another brewer that does not have the same code.

13. The brewer of claim 11 in which the selectively changing means includes one of (a) means for reading a smart card, (b) means for optically reading characters, (c) means for sensing an optical signal, (d) a keypad, (e) means for detecting an audible signal, and (f) a telephonic modem.

14. The brewer of claim 9 in combination with a smart card readable by the smart card reading means to selectively change the stored preselected amount of permitted use.

15. The brewer of claim 9 in combination with an ingredient package with a bar code readable by the bar code reading means to selectively change the stored preselected amount of permitted use.

* * * * *